(No Model.)

N. McDUFFIE.
STALK BREAKER.

No. 257,734.                                    Patented May 9, 1882.

WITNESSES:
Francis McArdle
C. Sedgwick

INVENTOR:
N. McDuffie
BY Munn & Co.
ATTORNEYS.

UNITED STATES PATENT OFFICE.

NEILL McDUFFIE, OF KENTYRE, SOUTH CAROLINA.

STALK-BREAKER.

SPECIFICATION forming part of Letters Patent No. 257,734, dated May 9, 1882.

Application filed March 4, 1882. (No model.)

*To all whom it may concern:*

Be it known that I, NEILL McDUFFIE, of Kentyre, Marion county, South Carolina, have invented a new and useful Improvement in Stalk-Breakers, of which the following is a full, clear, and exact description.

This invention is more particularly intended for the breaking of cotton-stalks. This work, when performed by hand with a stick, as is usually done, is not only laborious, but the portions of the stalks left standing and those broken off are mostly in long pieces, which are greatly in the way of subsequent planting and of the early cultivation of the crop.

The object of my invention is to produce a machine for this purpose which shall not only be labor-saving, but durable and so simple of construction that any farmer with ordinary tools at his command can readily make one, and which, when at work, will break the stalks into such small pieces that they will be but little in the way of preparing the ground for planting and future cultivation.

Reference is to be had to the accompanying drawings, forming part of this specification, in which similar letters of reference indicate corresponding parts in all the figures.

Figure 1:
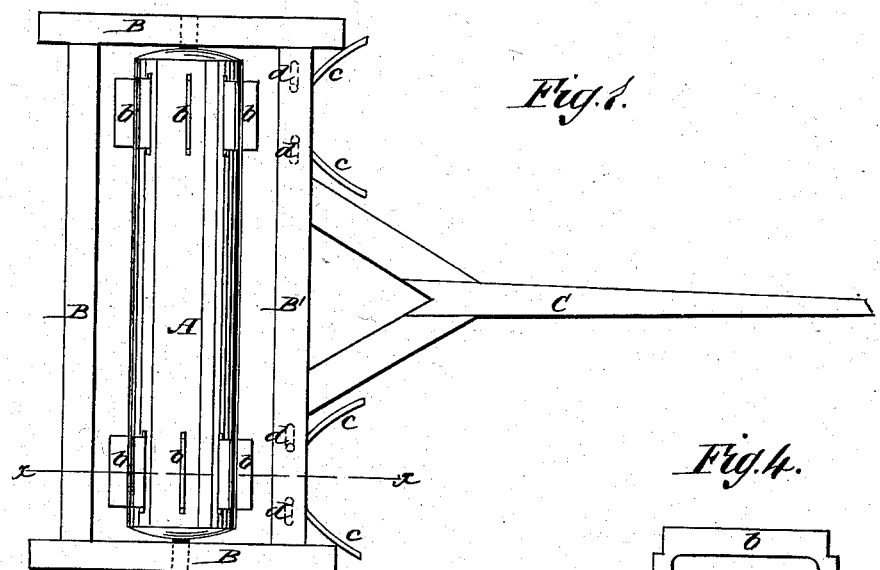
Figure 4:
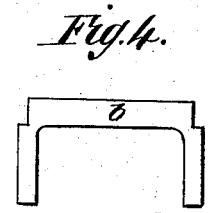
Figure 2:
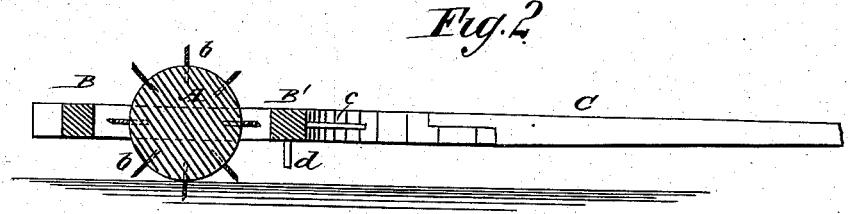
Figure 3:
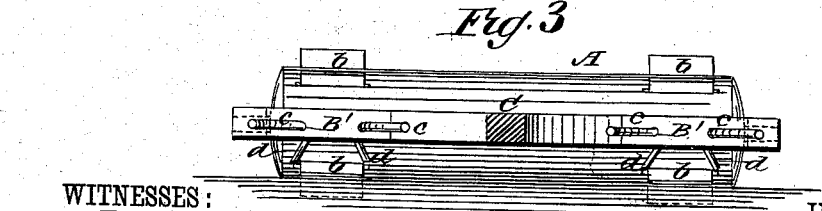

Figure 1 represents a plan of a stalk-breaking machine constructed in accordance with my invention. Fig. 2 is a longitudinal section of the same on the line $x\ x$ in Fig. 1. Fig. 3 is a front view thereof with the draft-pole or tongue in section, and Fig. 4 is a face view of one of the blades detached.

A indicates the breaking cylinder or roller, which may be twelve inches in diameter, (more or less,) and should be of such length that two series of radial blades, $b\ b$, with which it is armed near its ends, will be at a sufficient distance apart to take in two rows of stalks. These blades, which may be eighteen inches long and three inches wide, or of any other suitable dimensions, span the general width of the rows, and are sharp on their edges. They are of staple form in their construction, as clearly shown in Fig. 4, whereby they may be readily inserted or driven into the roller, which may be of wood.

The stalk-breaking cylinder A, with its two end sets or series of blades, $b\ b$, is hung (to rotate freely as it is drawn over the ground and with a moderate amount of play) in a frame, B B′, to which is attached a draft bar or pole, $c$, for hitching a mule or other animal to. This frame B B′ may be made of four scantlings, the front one, B′, of which is provided on its front side, at either end, with hooks or teeth $c\ c$, forming hands which gather the limber and leaning stalks in advance of the blades $b\ b$, and back of these hands, but in line with them, on the under side of the scantling B′, are two sets—that is, a pair at either end—of bolts or teeth, $d\ d$, forming guides, which hold the stalks in position till caught by the blades $b\ b$. The hooks or teeth $c\ c$ of each hand are made flaring in a forward direction and the teeth $d\ d$ of each guide flaring in a downward direction, to facilitate their gathering and holding the stalks in position, as required.

A machine constructed and provided as described will perform the same amount of work in a given time as six or eight men (more or less) under the ordinary system, and will do it more perfectly. By such machines the stalks may be broken down within six inches or so of the ground-surface.

Having thus described my invention, I claim as new and desire to secure by Letters Patent—

The combination, with the roll A and frame B B′, of the blades $b$, the pairs of diverging stalk-gatherers $c$ projecting in front and in rear of said gatherers, and the downwardly-projecting stalk-holders $d$, whereby the stalks are first gathered, then held in position, and finally broken, as described.

NEILL McDUFFIE.

Witnesses:
JOHN WILCOX, Jr.,
JAMES R. WATSON.